Figure 1:
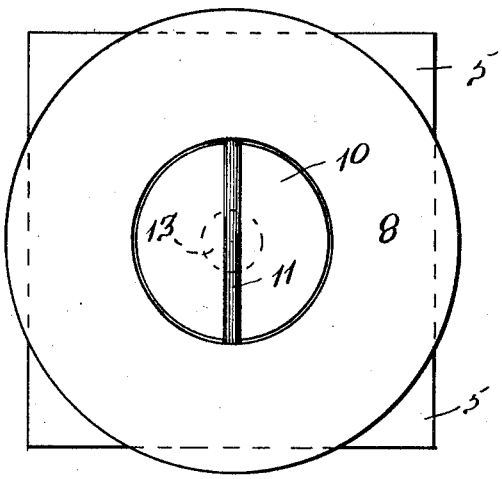

S. SIBO.
CUSPIDOR.
APPLICATION FILED NOV. 29, 1910.

997,014.

Patented July 4, 1911.

WITNESSES

INVENTOR
S. Sibo
By
Attorneys

UNITED STATES PATENT OFFICE.

STEVE SIBO, OF NEW YORK, N. Y.

CUSPIDOR.

997,014.　　　　Specification of Letters Patent.　　Patented July 4, 1911.

Application filed November 29, 1910. Serial No. 594,781.

*To all whom it may concern:*

Be it known that I, STEVE SIBO, a subject of the King of Hungary, residing at New York, in the county of New York and State of New York, have invented certain new and useful Improvements in Cuspidors, of which the following is a specification, reference being had therein to the accompanying drawing.

This invention relates to cuspidors, and the objects of my invention are to provide a cuspidor with positive and reliable means in a manner as will be hereinafter set forth for preventing the contents thereof from being spilled when the cuspidor is accidentally upset or tilted, and to provide a cuspidor that can be advantageously used in depots, hotels, theaters and public places where pedestrians are liable to accidentally upset the cuspidors.

Further objects of the invention are to provide a cuspidor that is sanitary, easy to clean, simple in construction, inexpensive to manufacture and durable.

I attain the above objects by a mechanical construction that will be hereinafter specifically described and then claimed, and reference will now be had to the drawing, wherein:—

Figure 2:
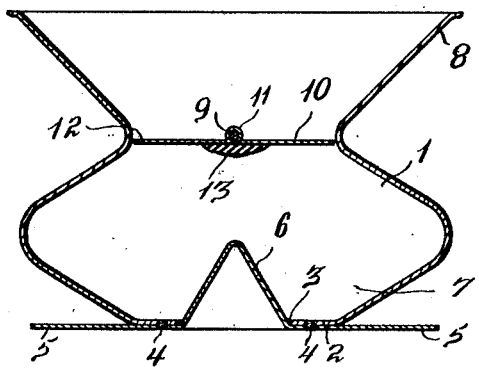
Figure 3:
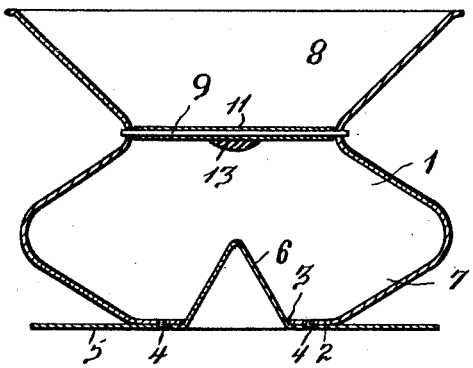

Figure 1 is a plan of a cuspidor, Fig. 2 is a vertical cross sectional view of the same, Fig. 3 is a vertical transverse sectional view of the cuspidor.

A cuspidor in accordance with this invention comprises a double frusto-conical shaped receptacle 1 having a flat bottom 2 provided with a central opening 3. Screwed or otherwise connected to the flat bottom 2, as at 4 is a base plate 5, preferably rectangular in plan and of sufficient size to prevent the receptacle 1 from being accidentally tilted or upset. The base plate 5 is provided with a central conical-shaped deflector 6 adapted to extend into the receptacle 1 and close the opening 3, said deflector providing an annular race 7 within the bottom of the receptacle 1 in which matter can accumulate. The upper end of the receptacle 1 is provided with a funnel-shaped mouth-piece 8 and trunnioned at the juncture of said mouth-piece with said receptacle by a transverse pin 9 is a flap lid or valve 10 having a central transverse barrel 11 to receive the pin 9. The lid 10 is circular in plan and adapted to close the opening 12, said lid having the under side thereof weighted by solder or other matter, as at 13 to normally retain the lid 10 in a closed position. The lid 10 is balanced within the opening 12 whereby when matter is deposited upon said lid, the matter will be immediately precipitated into the receptacle 1.

By removing the base plate 5 and the deflector 6, the entire interior of the cuspidor can be flushed and all foreign matter removed, thereby maintaining the cuspidor in a sanitary condition.

The lid 10 prevents the contents of the cuspidor from being observed and to a great extent prevents odors and fumes arising from matter that be deposited in the cuspidor.

The deflector 6 prevents matter from accumulating centrally of the cuspidor that might interfere with the movement of the flap lid 10 and particularly after considerable matter has been placed in the cuspidor.

The cuspidor in its entirety is constructed of light and durable metal and can be finished as desired.

What I claim is:—

A cuspidor embodying a double frusto-conical shaped receptacle having a flat bottom provided with a central opening, a rectangular base plate detachably mounted in the flat bottom of said cuspidor, a conical-shaped deflector carried by said base plate and extending upwardly through said opening into said receptacle, a funnel-shaped mouth-piece carried by the upper end of said receptacle, a flap lid trunnioned at the juncture of said mouth-piece with said receptacle and adapted to close the opening at the upper end of said receptacle, and a weight carried by the under side of said flap lid and adapted to normally retain said flap lid in a closed position.

In testimony whereof I affix my signature in the presence of two witnesses.

STEVE SIBO.

Witnesses:
　STEFAN ANANISALÓ,
　STEFÁN TÜLLCI.